United States Patent
Noble et al.

(10) Patent No.: US 10,558,349 B2
(45) Date of Patent: Feb. 11, 2020

(54) FUNCTIONAL SCROLLBAR AND SYSTEM

(71) Applicant: Medidata Solutions, Inc., New York, NY (US)

(72) Inventors: Matthew Noble, New York, NY (US); Jay Chen, New Hyde Park, NY (US); Kelly Kaplan, Kentfield, CA (US)

(73) Assignee: Medidata Solutions, Inc., New York, NY (US)

( * ) Notice: Subject to any disclaimer, the term of this patent is extended or adjusted under 35 U.S.C. 154(b) by 636 days.

(21) Appl. No.: 14/855,189

(22) Filed: Sep. 15, 2015

(65) Prior Publication Data

US 2017/0075557 A1    Mar. 16, 2017

(51) Int. Cl.
| | | |
|---|---|---|
| G06F 3/048 | (2013.01) | |
| G06F 3/0485 | (2013.01) | |
| G06F 3/0484 | (2013.01) | |
| G06F 17/24 | (2006.01) | |
| G06F 16/22 | (2019.01) | |
| G06F 16/25 | (2019.01) | |

(52) U.S. Cl.
CPC ...... *G06F 3/04855* (2013.01); *G06F 3/04842* (2013.01); *G06F 16/221* (2019.01); *G06F 16/252* (2019.01); *G06F 17/245* (2013.01)

(58) Field of Classification Search
None
See application file for complete search history.

(56) References Cited

U.S. PATENT DOCUMENTS

| | | | |
|---|---|---|---|
| 5,339,391 A | 8/1994 | Wroblewski et al. | |
| 5,506,951 A | 4/1996 | Ishikawa | |
| 5,510,808 A * | 4/1996 | Cina, Jr. | G06F 3/04855 |
| | | | 345/684 |
| 5,550,969 A | 8/1996 | Torres et al. | |
| 7,487,462 B2 | 2/2009 | Good et al. | |
| 2006/0026665 A1* | 2/2006 | Rodriguez | H04N 5/44543 |
| | | | 725/135 |
| 2009/0222423 A1* | 9/2009 | Haruta | G06F 3/0485 |
| 2011/0167381 A1 | 7/2011 | Kahn | |
| 2011/0191711 A1* | 8/2011 | Gill | G06Q 10/20 |
| | | | 715/780 |

(Continued)

OTHER PUBLICATIONS

Disclosed Anonymously, Quick Scrollbar repositioning to automatically detected user-interesting points, Sep. 19, 2011, IP.com Database Technical Disclosure, pp. 1-4 (Year: 2011).*

(Continued)

*Primary Examiner* — Tam T Tran
(74) *Attorney, Agent, or Firm* — Steptoe & Johnson LLP; Robert Greenfeld (57) ABSTRACT

An improvement to a graphical user interface disposed within a display includes a functional scrollbar, a magnifier disposed on the functional scrollbar to enhance the view of the functional scrollbar, and a filter for selecting attributes of data within a data file. The functional scrollbar includes two parts, one that has a plurality of portions indicative of content of the data file shown on the display and one that has a plurality of portions indicative of content of the data file not shown on the display. The two parts of the scrollbar include portions indicative of content within the data file that matches the filter selection. A system for generating a functional scrollbar is also described and claimed.

19 Claims, 7 Drawing Sheets

(56) References Cited

U.S. PATENT DOCUMENTS

| | | | | |
|---|---|---|---|---|
| 2013/0097481 A1* | 4/2013 | Kotler | ............... | G06F 17/241 |
| | | | | 715/230 |
| 2014/0136939 A1* | 5/2014 | Chan | ............... | G06F 17/246 |
| | | | | 715/227 |
| 2014/0365886 A1* | 12/2014 | Koenig | ............... | G06F 3/04855 |
| | | | | 715/711 |
| 2016/0061620 A1* | 3/2016 | Newlin | ............... | G01C 21/3676 |
| | | | | 701/533 |

OTHER PUBLICATIONS

Siemens Juergen Carstens, Scroll Bar Control with Integrated Methods for Displaying the Position of Slided Objects, Nov. 23, 2009, IP.com Database Technical Disclosure, pp. 1-3 (Year: 2009).*

* cited by examiner

FUNCTIONAL SCROLLBAR AND SYSTEM

BACKGROUND

When viewing a software application, webpage, computer-generated document, table, or spreadsheet in a computer display or window, scrollbars may be used to scroll continuous text, pictures, and other content. A vertical or horizontal scrollbar may be located on the side or bottom of a window that allows a user to move the window viewing area up, down, left, or right. The scrollbar may include a long rectangular area containing a bar that can be scrolled along a track (or trough) to move the portion of the software application, webpage document, table, or spreadsheet to be displayed. Accordingly, moving the scrollbar changes the area that is displayed to a user.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

While a scrollbar may allow a user to change a computer window viewing area to display content not currently displayed, a scrollbar generally does not indicate the existence of specific content of a data file, software application, webpage, document, table, or spreadsheet, or the content itself that is not currently displayed without moving the scrollbar. For example, in a table, a visual indicator such as a color or a marking of a cell contained in the table may be used to convey the status of the cell, which may be active or inactive, or may contain a particular value. Accordingly, the status of a particular cell, row, and/or column currently in focus may be displayed, but the existence of content of the table not currently in view, and/or the content itself that is not in view, is not indicated by the scrollbar.

A scrollbar in a word processing document may indicate the particular page number or section number associated with the viewing area that is displayed, as well as the entire length of the document. However, the existence of content of the document not currently in view and/or the content itself that is not currently displayed by the word processing application is not indicated by the scrollbar. For example, when viewing comments and edits to a document via the Microsoft® Word Track Changes application, the existence of comments and/or changes pertaining to pages not currently displayed is not indicated by the scrollbar.

For a large table or spreadsheet that contains many cells, rows, and/or columns, and/or a long webpage and/or document that contains many lines and/or sections, there is currently not a satisfactory way for a user to understand the context of how much additional data are not currently being displayed due to the user's scrolling position. A functional scrollbar system may utilize a scrollbar track (or trough) to indicate the existence of content and contextual status of content displayed in a software application, webpage, document, table, and/or spreadsheet to solve this problem. A functional scrollbar may reflect information that is not currently displayed to a user on the screen, and it may also be dynamically updated as filters are changed by the user or different filter criteria are selected by the user.

Embodiments of the present invention may be used in a variety of applications. The functional scrollbar system may be used by almost any software table, document, presentation of data, etc. Although the present invention is not limited in this respect, the systems and methods disclosed herein may be used in or with clinical drug, biologic, or device trials. For example, for a clinical trial schedule of activities, the scrollbar tracks may indicate the number of visits and activities in the schedule. The functional scrollbar system may also be used by budgeting and stock tracking applications.

For example, for a table containing data pertaining to a clinical trial's schedule of activities, the scrollbar tracks may indicate the number of visits and activities in the schedule. The system may divide each scrollbar track into boxes that automatically resize and scale to fit the number of rows and columns in a table or spreadsheet, or the number of lines and/or sections in a webpage and/or document. Without a visual indicator that conveys status corresponding to particular content not currently displayed, a user may not know if the cells, rows and/or columns, or lines and/or sections that are currently not displayed have a status of which the user should be aware.

By using a visual indicator to convey status, which may be the color or marking in a cell, the functional scrollbar system may indicate the status of cells, rows, and/or columns of a table or spreadsheet, or the lines and/or sections of a document or webpage. Accordingly, this visual indicator may provide information pertaining to the existence of content and contextual status of content not currently displayed in a software application, webpage, document, table and/or spreadsheet.

The indicators on the scrollbar track provided by the functional scrollbar system may indicate to a user that by scrolling further to an area that is currently not in view, the user may see more data having a status that may require attention. For example, in a word processing document that is being edited using Microsoft® Word's Track Changes application, the indicators on the functional scrollbar track may indicate places in the document that are not currently displayed to the user that include comments and changes that should be addressed. Additionally, in a table used to schedule activities in a clinical trial, the indicators on the functional scrollbar track may indicate particular activities that should be completed in the trial, but are not currently displayed to a user.

A visual indicator may convey the status of data that are static. For example in the context of a table used for the scheduling of activities in a clinical trial, a visual indicator on a scrollbar may indicate that a particular item needs attention as the trial progresses. A visual indicator may also convey the status of data that are dynamic. The visual indicators may be automatically updated in real time to convey the status of data that are dynamically changing, when the status is changed and/or new data are received.

The system may highlight and/or color specific items to indicate that the corresponding cell, row and/or column, or line and/or section should be reviewed, even if that row/column is not currently visible on the screen. The functional scrollbar may indicate the status, relationships, corresponding searches, and filters that have been performed on a set of data. For example, indicators on a scrollbar track may notify a user of data with a status that may require the user's attention. In the clinical trial context, this status may include a purpose such as safety, efficacy, screening, treatment, standard medical care, and period/visit type. Additionally, the status may indicate a particular cost or action item associated with the particular data content.

In one embodiment, the scrollbar may be a transparent rectangle, and may indicate the part of a document, webpage, table, and/or spreadsheet that is currently selected and displayed, while also still displaying a contextual track, which indicates the location and/or portion that is currently displayed in the viewing area in relationship to the entire document, webpage, table, and/or spreadsheet. In another embodiment in which tables or spreadsheets are very large and/or a webpage or document contains many lines and/or sections, the contextual pieces may be very small within the track. As such, the scrollbar may include a magnifier or act as a magnifier, and may show greater detail for the section of the track that is currently displayed or not displayed.

Figure 1:
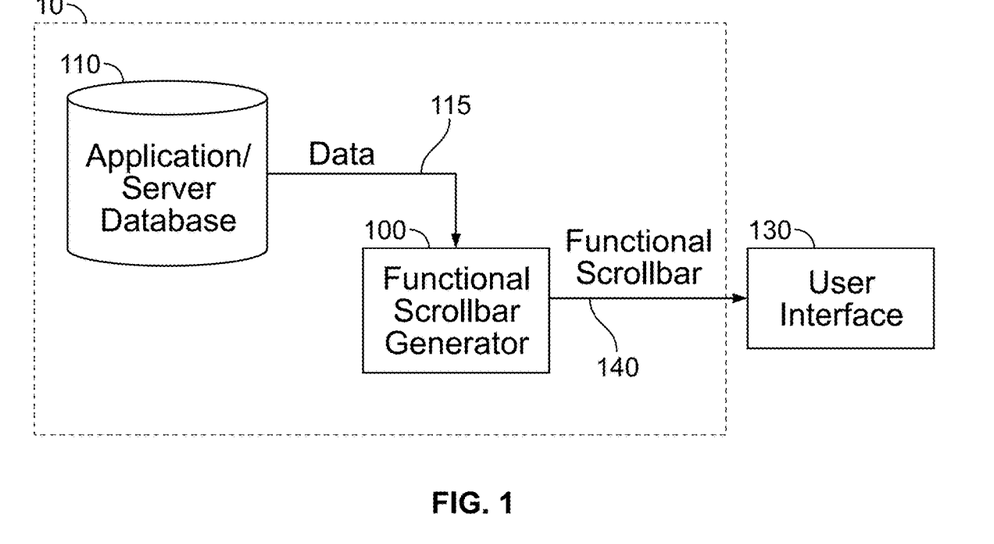
FIG. 1 is a block diagram of a system for generating a functional scrollbar, according to an embodiment of the present invention.

Reference is now made to FIG. 1, which is a block diagram of a system 10 for generating a functional scrollbar 140 that displays to a user the status of content, which may be displayed via a computer display or window. The content may be from a software application, webpage, computer generated document, table, and/or spreadsheet. The system may display the status of data not currently displayed due to the user's scrolling position. The system includes a functional scrollbar generator 100 and application server database 110. System 10 may interact with user interface 130, which displays the content to a user. Data 115 associated with content displayed to a user that is stored on application server database 110 may be received by functional scrollbar generator 100. The associated data and contextual status of the content that are received by functional scrollbar generator 100 may be aggregated, filtered, and optimized. For example, a functional scrollbar may be generated for data that are aggregated from various disparate and integrated data sources. For example, in a clinical trial visit schedule in which each column represents a site visit, columns may be highlighted if the total cost of the visit is above a certain threshold. Alternatively, cells within a row, representing a specific activity within the clinical trial may be highlighted if the number of times the activity is performed in the study is above historic averages for clinical trials of similar design. Since not all cells and rows may be visible at once, the scrollbars may indicate where these data are highlighted and meet the filter criteria, but are not currently displayed on screen.

At a particular point in time, all of the cells, rows and/or columns of a table or spreadsheet, or lines and/or sections of a webpage and/or document may be larger than user interface 130 and thus not be visible to a user, so functional scrollbar generator 100 may generate functional scrollbar 140. Specifically, functional scrollbar generator 100 may utilize HTML (hypertext markup language) and/or JavaScript® to retrieve information pertaining to the particular elements of the data, which may include the associated cells, rows and/or columns of a table or spreadsheet, or lines and/or sections of a webpage and/or document. Functional scrollbar generator 100 may build arrays, which may be used to generate functional scrollbar 140, which may be displayed by user interface 130.

In one embodiment, functional scrollbar 140 may be broken up into boxes that correspond to particular data points associated with particular cells, rows, columns, lines, or sections of a table, spreadsheet, webpage, and/or document. The boxes may be highlighted and/or colored to indicate that particular data content should be reviewed, even if the data are not currently visible to a user based on the user's scrolling position.

Information pertaining to functional scrollbar 140 may be stored in a database (not shown). User interface 130 may display to a user functional scrollbar 140 associated with accessed data. The contextual track of generated functional scrollbar 140 may indicate how much additional data are not currently being displayed based on the user's scrolling position.

The parts and blocks shown in FIG. 1 are examples of parts that may comprise system 10 and do not limit the parts or modules that may be included in or connected to or associated with system 10. The boxes in FIG. 1 may involve other operations not shown.

Figure 2:
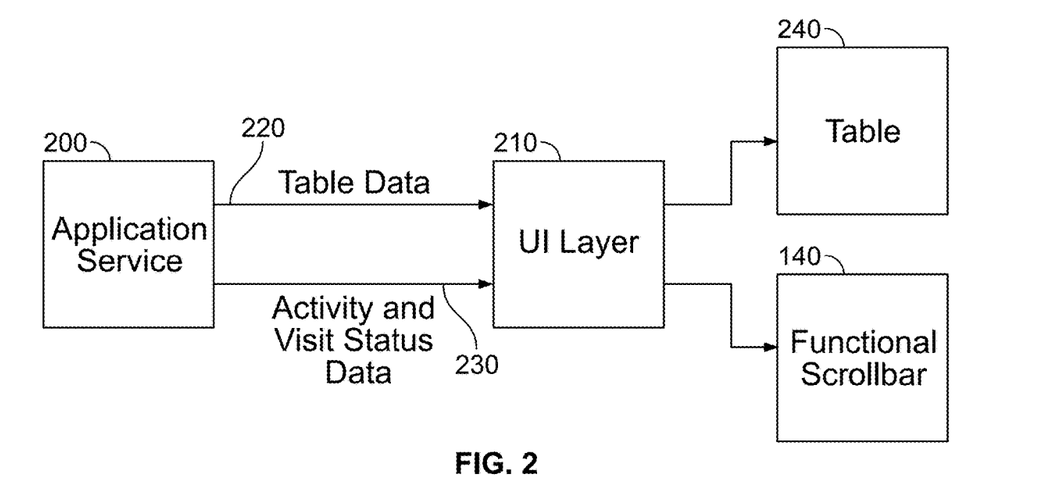
FIG. 2 is a flowchart illustrating the general operation of a system for generating a functional scrollbar, according to an embodiment of the present invention.

FIG. 2 is a flowchart illustrating the general operation of system 10 for generating a functional scrollbar. According to FIG. 2, a user interface layer ("UI Layer") 210 may render a table 240 and functional scrollbar 140 in a browser based on table data 220 and activity and visit status data 230 received from an application service 200. The application service may store data to be presented in the user interface, for example, the visits, activities, and events represented on a clinical trial visit schedule. The application service may also include cost information about specific activities, as well as information about benchmarks and averages against which the current study may be compared. UI Layer 210 may use an application protocol such as HTTP (Hypertext Transfer Protocol) to retrieve table data 220, such as the rows, columns, and cells that will be used by UI layer 210 to render a grid to depict table 240. UI Layer 210 may also use an application protocol such as HTTP to retrieve activity and visit status data 230, associated with the table's rows, columns, and cells, which may be an array of data pertaining to the status of a particular activity or visit that will be used by UI Layer 210 to render functional scrollbar 140.

UI Layer 210 may map this status information to a visual indicator in the generated vertical and horizontal functional scrollbars. The visual indicator may include a color or marking of a cell. As table 240 is updated to reflect changes to data, as well as to reflect new data that are received by the system, the scrollbar is dynamically updated to reflect such changes.

Figure 3A:
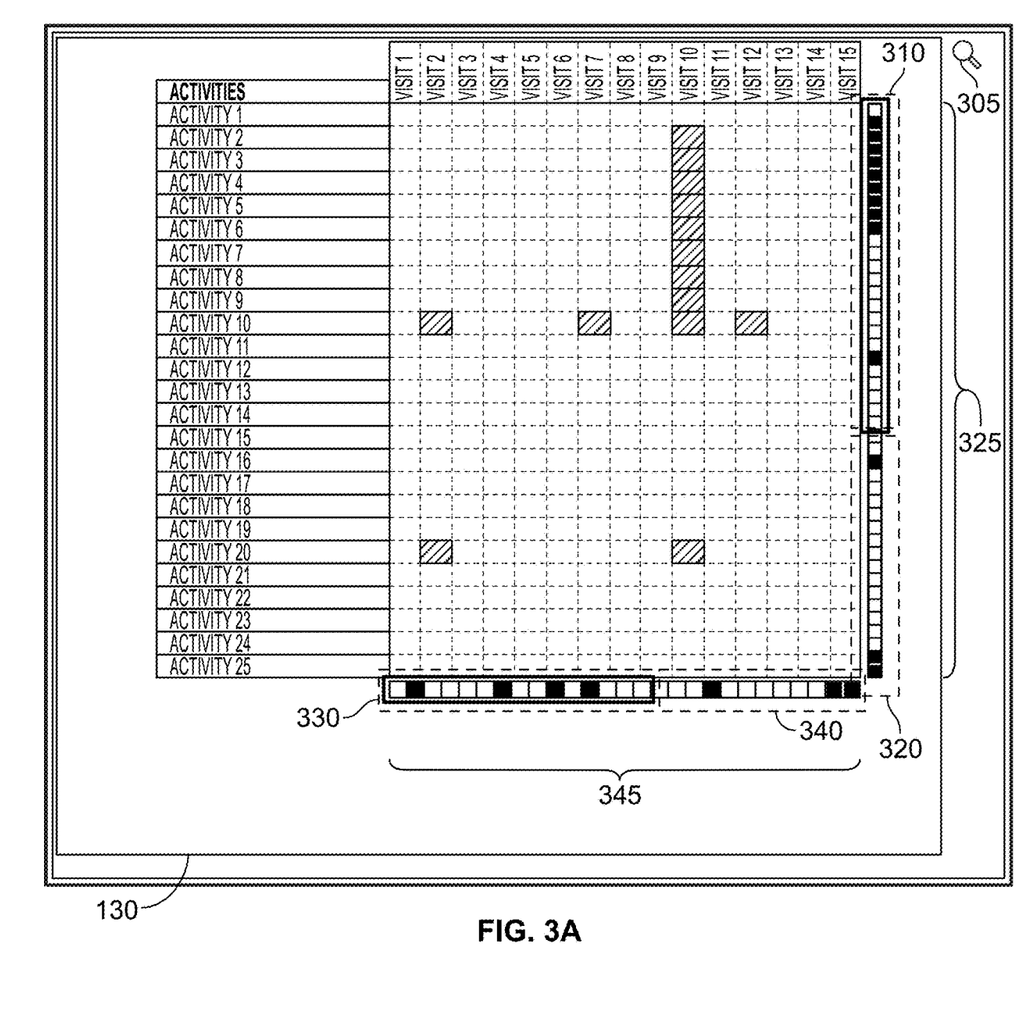
FIGS. 3A-3C depict user interfaces for displaying functional scrollbars, according to embodiments of the present invention.
Figure 3B:
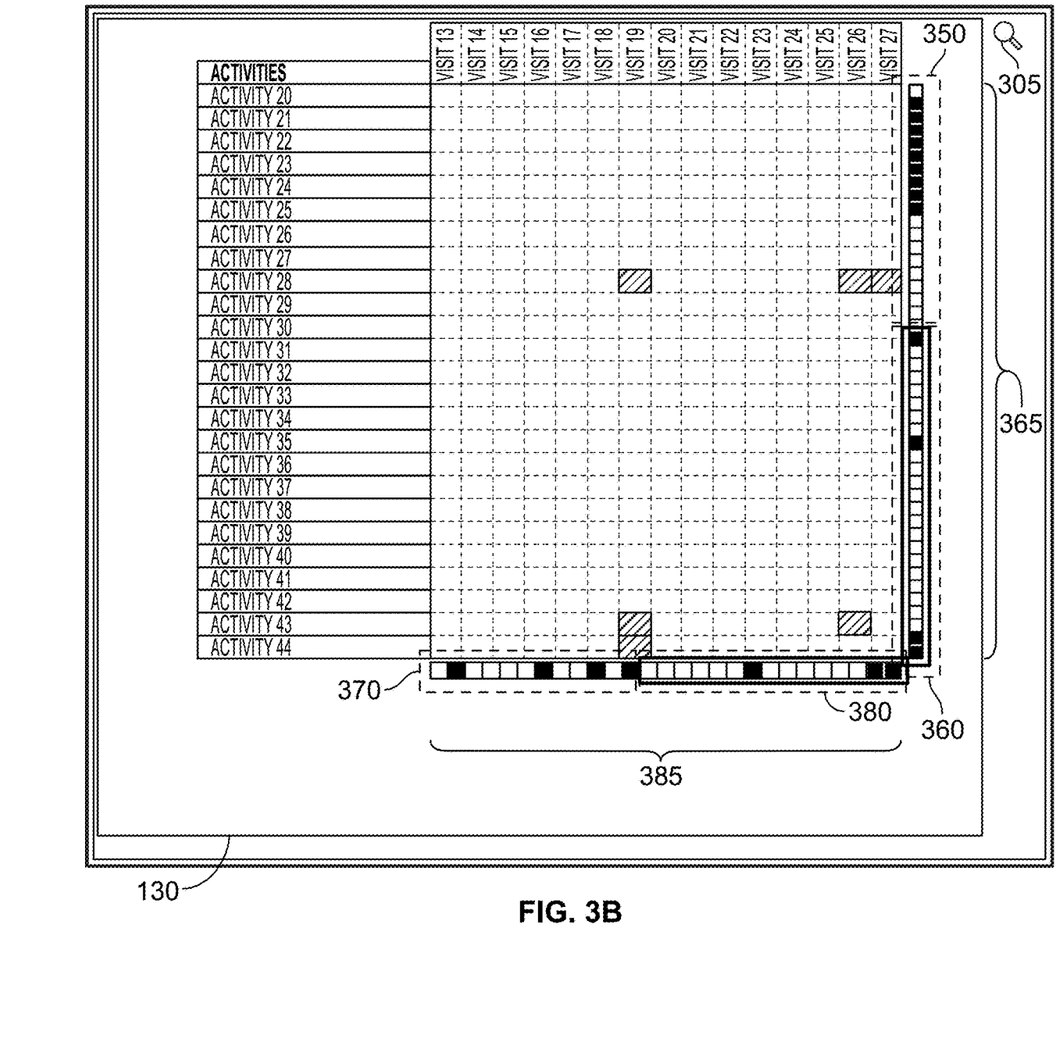

FIGS. 3A and 3B illustrate user interface 130 for displaying generated functional scrollbars that show a user the status of content contained in a table, including the status of data not currently in view due to the user's scrolling position. Users of the functional scrollbar may include the different entities involved in a clinical trial, such as sponsors (e.g., drug manufacturers), hospitals, doctors (principal investigators), nurses, and contract research organizations ("CROs") that manage and run clinical trials. These entities may use the functional scrollbar in all stages of a clinical trial, which may include planning the trial, supervising the trial, and conducting the trial.

For a particular table comprising columns along the x-axis, which may represent visit numbers, and rows along the y-axis, which may represent activities, system 10 may generate a functional x-axis scrollbar 345 and a functional y-axis scrollbar 325. For a table pertaining to a clinical trial, these activities may include clinical activities, such as a blood draw, a blood pressure reading, and dispensation of medicine, to name just a few. If not in a clinical trial, a particular table may contain information pertaining to, for example, stocks, where the rows along the y-axis may represent the stock, the columns along the x-axis may represent dates, and the cells may represent the stock price on a particular date. Specific cells may be selected to be highlighted based on a filter such as a 52-week high or low. Another example is a table that contains information pertaining to travel, where the rows along the y-axis may represent hotels, the columns along the x-axis may represent dates, and the cells may represent the associated price of the hotel on a particular date. Specific cells may be highlighted based on a price filter, which may filter the cell based on a minimum or maximum price. In another example, the columns along the x-axis may represent departure dates, the rows along the y-axis may represent return dates, and the cells may represent the associated price for a roundtrip ticket or total hotel stay between the departure and return dates. Specific cells may also be selected to be highlighted based on a price filter, which may filter the cell based on a minimum or maximum price.

In the example shown in the figures, FIG. 3A shows visits 1-15 and activities 1-25 (i.e., the top left part of a table) and FIG. 3B shows visits 13-27 and activities 20-44 (i.e., the bottom right part of the same table). There may be some overlap between the figures. The track of each scrollbar 325, 345, 365, 385 may be broken up into boxes that resize/scale to fit the number of rows/columns within the scrollbar track highlighted and/or colored, indicating that the corresponding row/column should be reviewed, even if that row/column is not currently visible on the screen. The cells to be reviewed may be highlighted based upon filters applied by the user or system. A user may operate a mouse to hover a cursor over the cell once the user has scrolled to the cell to view a recommendation (e.g., remove the visit, remove the activity, etc.). The user may also click into the cell and view a new page that provides the details of the cell. In FIG. 3A, portion 310 of functional scrollbar 325 and portion 330 of functional scrollbar 345 may indicate the part of the table that is currently displayed. Portion 320 of functional scrollbar 325 and portion 340 of functional scrollbar 345 may display the contextual track corresponding to the cells, rows, and/or columns of the table that are not currently displayed.

Functional scrollbar 325 indicates that displayed activities 2-10 and 20 should be reviewed, as indicated by the highlighted boxes in portion 310. Displayed visits 2, 7, 10, and 12 should be reviewed, as indicated by the highlighted boxes in portion 330 of functional scrollbar 345. The highlighted boxes of portion 320 of functional scrollbar 325 indicate three additional activities that should be reviewed, which FIG. 3B reveals correspond to activities 28, 43, and 44, respectively. Similarly, the highlighted boxes of portion 340 of functional scrollbar 345 indicate three additional visits that should be reviewed, which FIG. 3B reveals correspond to visits 19, 26, and 27. In FIG. 3B, portion 360 of functional scrollbar 365 and portion 380 of functional scrollbar 385 indicate the part of the table that is currently displayed, while portion 350 of functional scrollbar 365 and portion 370 of functional scrollbar 385 indicate the part of the table that is not currently displayed.

Figure 3C:
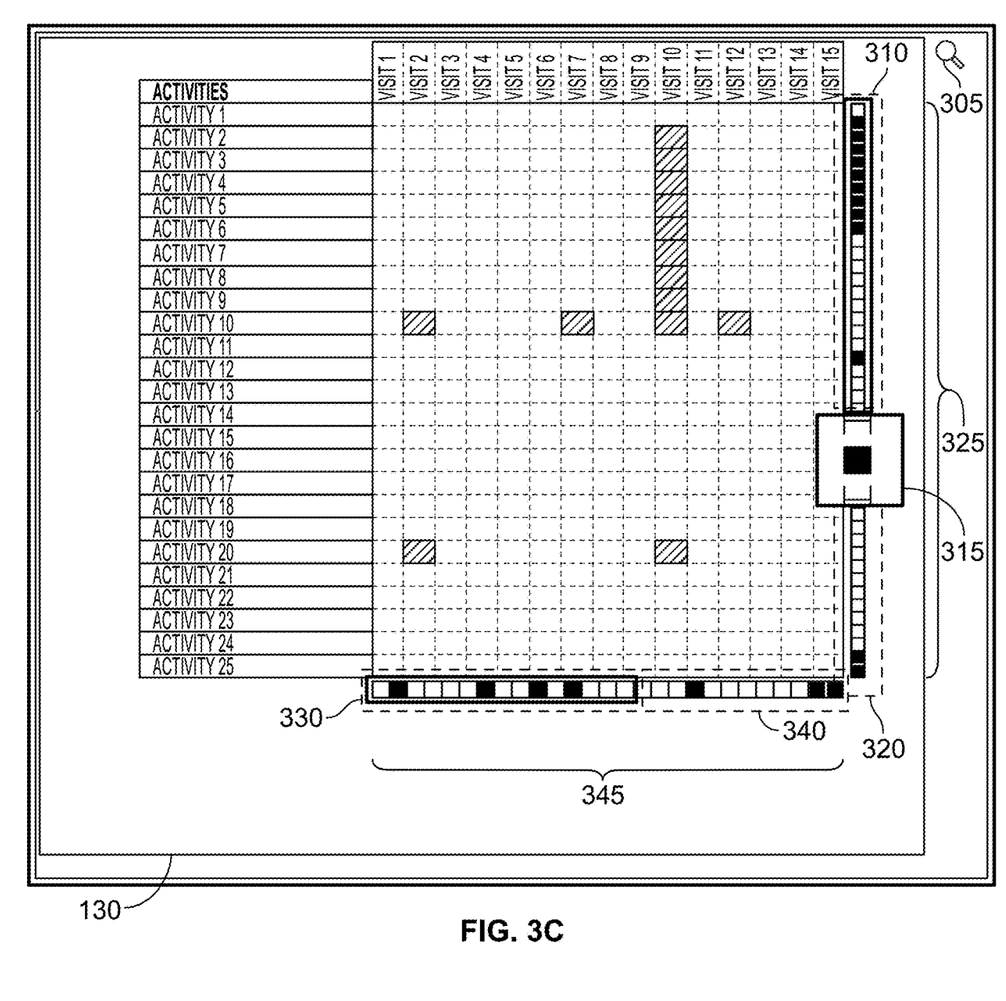

FIG. 3C illustrates generated functional scrollbars 325 and 345 that may include a magnifier 305 that shows greater detail for either section of the track. For example, for large tables that contain many cells, rows, and/or columns, the contextual pieces may be very small within the track. By hovering over a section of a track with the magnifier, the selected section of the track may be zoomed in to display more details associated with the selected contextual pieces, which may include data elements, as illustrated by 315, pertaining to the electronic schedule of activities. A user may operate a mouse or cursor to move the slider on the scrollbar, and the slider may magnify the selected portion of the track.

Figure 4A:
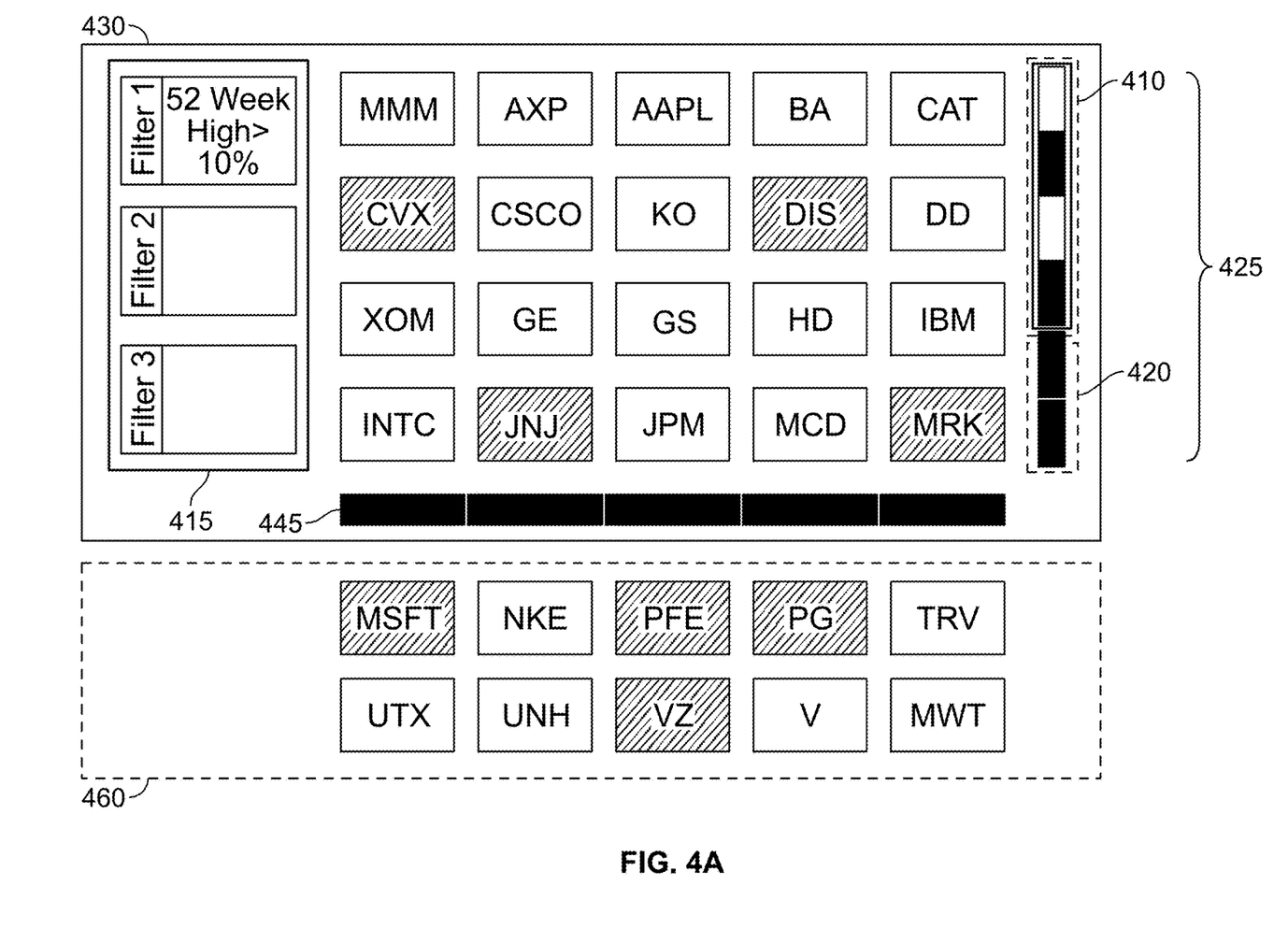
FIGS. 4A-4B depict user interfaces for displaying functional scrollbars with filtering options, according to embodiments of the present invention.
Figure 4B:
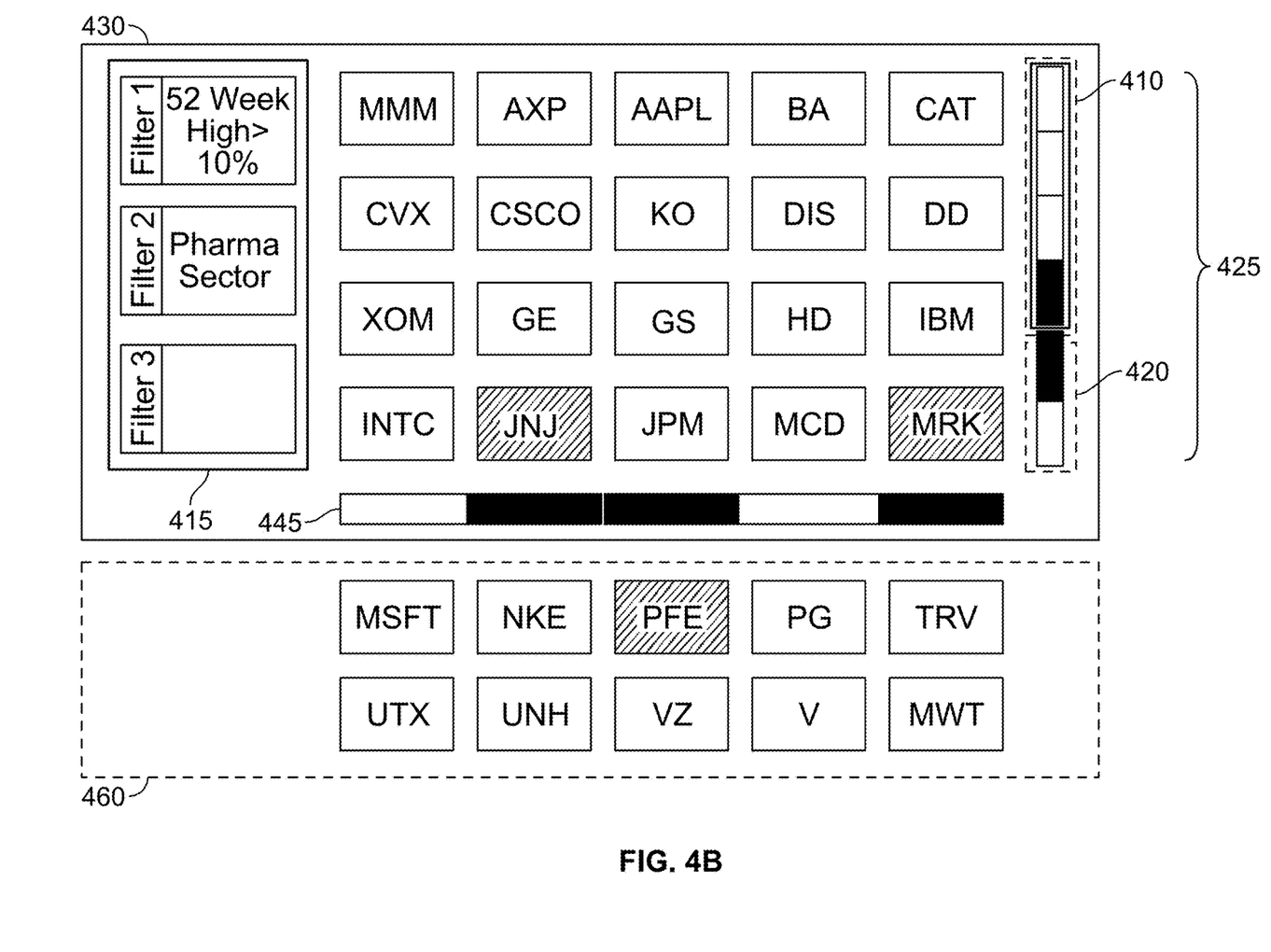

FIGS. 4A and 4B illustrate a user interface for displaying generated functional scrollbars like those in FIGS. 3A-3C, used by a stock tracking application that displays information pertaining to stocks. The data displayed by the functional scroll bar may be filtered based on the selection shown in filter box 415. The system-generated functional scrollbar may reflect out-of-screen values that are highlighted as the result of a filter selection. Furthermore, the functional scrollbar may reflect information that is not currently displayed to the user. The system may also dynamically update the generated functional scrollbar as different filters are indicated by the user.

For example, as illustrated in FIG. 4A, a data file may display the 30 stocks of the Dow Jones Industrial Average®. Out of the 30 stocks, a user may filter those having a 52-week high greater than 10% over the current stock price. The result may include eight stocks, four of which are displayed within user interface 430 and four of which lie within undisplayed portion 460. The boxes within portion 410 of scrollbar track 425 are highlighted to indicate data that should be reviewed, as they meet the selected filter criterion. The system-generated functional scrollbar also reflects the four out-of-screen values in two boxes of portion 420 of scrollbar track 425. Functional scrollbar 445 indicates the columns containing highlighted data, whether the data is in user interface 430 or in undisplayed portion 460.

Referring to FIG. 4B, a user may filter the stocks to be displayed based on both Filter 1—stocks having a 52-week high greater than 10% more than the current stock price— and Filter 2—stocks belonging to the pharmaceutical ("Pharma") sector. The highlighted "JNJ" and "MRK" blocks in user interface 430 represent the stocks currently displayed to a user which meet both filter criteria. The box within portion 410 of scrollbar track 425 is highlighted to indicate that the data may be reviewed since they meet the selected filter criteria. The functional scrollbar may display optimized content, as it may reflect information that is not actually shown by the on-screen displayed information, such as which companies are in the Pharma sector. The system-generated functional scrollbar may also reflect out-of-screen values, not currently displayed to the user, that are highlighted as a result of the filter selections, as illustrated by the highlighted "PFE" box, which corresponds to the highlighted box within portion 420 of scrollbar track 425. Again, functional scrollbar 445 indicates the columns containing highlighted data, whether the data is in user interface 430 or in undisplayed portion 460.

Figure 5:
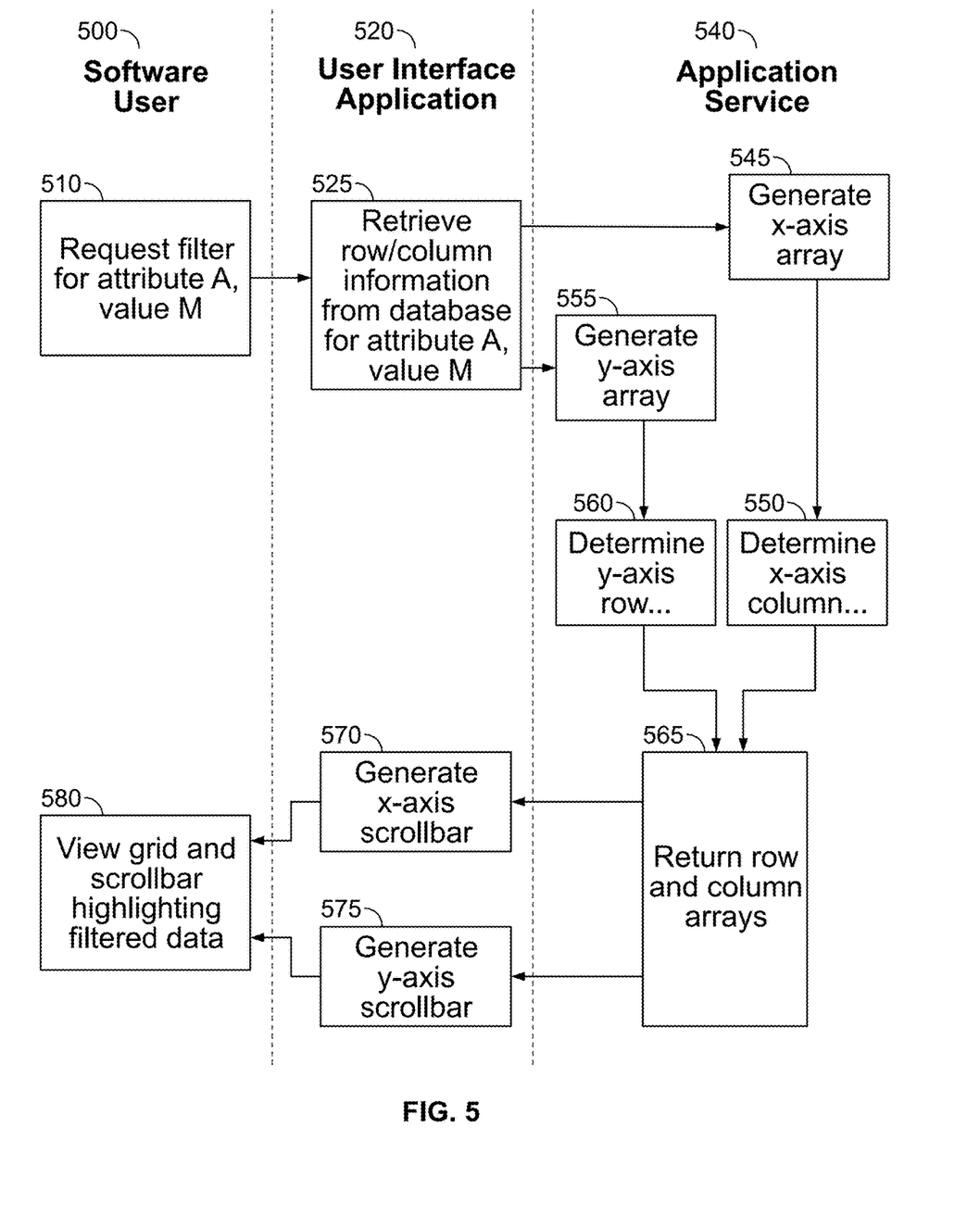
FIG. 5 is a flowchart illustrating the flow and processing of table-related data, according to an embodiment of the present invention.

FIG. 5 represents the flow and processing of table-related information among a software user 500, user interface application (or browser) 520, and application service 540 to generate a functional scrollbar. For particular table-related information displayed to software user 500, in operation 510 the user may request a filter associated with a criterion, such as a particular attribute A for a given value M. Referring back to FIG. 4A, a particular attribute A may be, for example, a 52-week high, and a given value M may be greater than 10% more than the current stock price. In operation 525, user interface application 520 may retrieve from database 110 row and column information for the displayed data and may use an AJAX call, HTML, and/or JavaScript® to perform this operation. The row and column information may be used by application service 540 in operations 545 and 555 to calculate and build x-axis and y-axis arrays, respectively, which may be used by user interface application 520 to generate in operations 570 and 575 an x-axis functional scrollbar and a y-axis functional scrollbar, respectively. The x-axis array may represent the x-axis, and application service 540 may determine in operation 550 if an associated column has a cell satisfying attribute A, value M, which may be used by user interface application 520 to return column arrays in operation 565. The y-axis array may represent the y-axis, and application service 540 may determine in operation 560 if an associated row has a cell satisfying attribute A, value M, which may be used by user interface application 520 to return row arrays in operation 565. User interface application 520 may display the generated x-axis and y-axis scrollbars so the data grid and the scrollbars highlighting the displayed data may be viewed in operation 580 by software user 500.

Besides the operations shown in FIG. 2 and FIG. 5, other operations or series of operations are contemplated to generate a functional scrollbar. Subsidiary determinations, filtering, and optimization may need to be made in order to carry out the operations in the flowchart. Moreover, the actual orders of the operations in the flow diagrams are not intended to be limiting, and the operations may be performed in any practical order.

There are several benefits to the present invention. The functional scrollbar allows a user to see that out-of-screen portions of a document or a table may be highlighted and thus important, and the user may use the scrollbar to quickly access those portions to determine why they are highlighted. Filters may provide the information that is highlighted in the scrollbar. In contrast to prior applications that may impart highlights to a document showing the location of text strings for which a user may search, for example, by using the Control-F (find) function, the use of filters in the present invention allows the scrollbar to indicate substantive information and metadata that no Control-F or other text search would bring up. Put another way, a user cannot use these prior applications to perform a text search for "Pharma only" companies or companies whose stock price has satisfied a specific criterion, or search for other information requiring application of logic to the data in the document or table. Moreover, changing the filters also dynamically changes the scrollbar, which does not occur with prior applications.

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

Referring back to the block diagram for generating a functional scrollbar shown in FIG. 1, in an embodiment, functional scrollbar generator 100 configured to generate a functional scrollbar may include a general-purpose computer and may have an internal or external memory for storing data and programs (not shown). The general-purpose computer may include a central processing unit (CPU) for executing instructions in response to commands and a communication device for sending and receiving data. In one embodiment, the data and contextual status associated with content may be transmitted over a network, which may include a communications interface that allows software and data to be transferred between client device, processor, the other system components, and the external systems.

Computer programs that may be associated with applications of the system for generating a functional scrollbar (called "computer control logic") may be stored in the main memory or in secondary memory. Such computer programs may also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In one embodiment, the computer-based methods may be accessed or implemented over the World Wide Web by providing access via a Web Page to the methods described herein. Accordingly, the Web Page may be identified by a URL. The URL may denote both a server and a particular file or page on the server. In this embodiment, it is envisioned that a client computer system may interact with a browser to select a particular URL, which in turn may cause the browser to send a request for that URL or page to the server identified in the URL. Typically, the server may respond to the request by retrieving the requested page and transmitting the data for that page back to the requesting client computer system (the client/server interaction may be typically performed in accordance with HTTP). The selected page may then be displayed to the user on the client's display screen. The client may then cause the server containing a computer program to launch an application, for example, to perform an analysis according to the described techniques. In another implementation, the server may download an application to be run on the client to perform an analysis according to the described techniques.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A display including a graphical user interface, comprising:
   a functional scrollbar displayed on the graphical user interface, the functional scrollbar including:
      a first part and a second part, the first part comprising a first plurality of portions indicative of content of a data file shown on the display; and the second part comprising a second plurality of portions indicative of content of the data file not shown on the display;

a magnifier disposed on the functional scrollbar to magnify the view of the functional scrollbar; and a filter, displayed on the graphical user interface, for selecting attributes of data within the data file, wherein:

the first and second parts of the functional scrollbar include portions indicative of content within the data file that matches the filter selection; and the functional scrollbar is dynamically updated as different filter criteria are selected by a user.

2. The display including the graphical user interface of claim 1, wherein the functional scrollbar is a functional vertical scrollbar and further comprising a functional horizontal scrollbar.

3. The display including the graphical user interface of claim 2, wherein the functional horizontal scrollbar includes a third part and a fourth part, the third part comprising a third plurality of portions indicative of content of columns in the data file shown on the display; and the fourth part comprising a fourth plurality of portions indicative of content of columns in the data file not shown on the display.

4. The display including the graphical user interface of claim 3, wherein the third and fourth parts of the functional horizontal scrollbar include portions indicative of content within the data file that matches the filter selection.

5. The display including the graphical user interface of claim 1, wherein a cursor may hover over the portions indicative of content and display the content of the portion.

6. The display including the graphical user interface of claim 1, wherein a click into a portion indicative of content displays a new page that provides the details of the content of the portion.

7. The display including the graphical user interface of claim 1, wherein the portions are indicative of contextual status of content within the data file.

8. The display including the graphical user interface of claim 1, wherein the data file acquires new data and the functional scrollbar is dynamically updated to reflect such new data.

9. The display including the graphical user interface of claim 1, wherein the functional scrollbar indicates at least one of status, relationships, corresponding searches, and filters that have been performed on the data file.

10. The display including the graphical user interface of claim 9, wherein the data file includes data from a clinical trial and the status includes at least one of safety, efficacy, screening, treatment, standard medical care, and period/visit type.

11. The display including the graphical user interface of claim 1, wherein the data file includes data from a clinical trial and the content indicates a cost associated with the data.

12. The display including the graphical user interface of claim 11, wherein the cost of a clinical trial site visit is above a threshold.

13. The display including the graphical user interface of claim 1, wherein the data file includes data from a clinical trial and the content indicates an action item associated with the data.

14. The display including the graphical user interface of claim 1, wherein the data file includes data from a clinical trial and the content indicates that the number of times an activity is performed in the trial is above an historic average for clinical trials of similar design.

15. A system for displaying a table or grid in a graphical user interface, comprising:

a processor;

a user interface application, called by the processor, for retrieving row and column information for rendering the table or grid; and an application service, called by the processor, that uses the row and column information to calculate and generate an x-axis array and a y-axis array and for determining cells of the table or grid that satisfy a criterion, wherein the user interface application uses the determined cell information to generate x-axis and y-axis functional scrollbars that indicate rows and columns satisfying the criterion, each functional scrollbar including a magnifier to magnify the view of the functional scrollbar.

16. The system of claim 15, wherein the functional scrollbars are dynamically updated as different criteria are selected by a user.

17. The system of claim 15, wherein the user interface application acquires new information and the functional scrollbars are dynamically updated to reflect such new information.

18. The system of claim 15, wherein the information is from a clinical trial and the criterion corresponds to a cost associated with the information.

19. The system of claim 15, wherein the information is from a clinical trial and the criterion corresponds to an action item associated with the information.

* * * * *